(12) United States Patent
Wallmark et al.

(10) Patent No.: US 7,477,923 B2
(45) Date of Patent: Jan. 13, 2009

(54) EXCHANGEABLE MODULE FOR ADDITIONAL FUNCTIONALITY

(75) Inventors: Magnus Wallmark, Göteborg (SE); Mattias Jonsson, Göteborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/582,490

(22) PCT Filed: Dec. 18, 2003

(86) PCT No.: PCT/SE03/02018

§ 371 (c)(1), (2), (4) Date: Apr. 10, 2007

(87) PCT Pub. No.: WO2005/060218

PCT Pub. Date: Jun. 30, 2005

(65) Prior Publication Data

US 2007/0247136 A1    Oct. 25, 2007

(51) Int. Cl.
*H04B 1/38* (2006.01)

(52) U.S. Cl. .................. 455/572; 455/127.1; 455/343.1; 713/189; 713/192; 713/193

(58) Field of Classification Search .................. 455/572; 323/371
See application file for complete search history.

(56) References Cited

U.S. PATENT DOCUMENTS

| | | | | |
|---|---|---|---|---|
| 4,229,817 A | * | 10/1980 | Morgan et al. ................. | 380/52 |
| 5,048,085 A | * | 9/1991 | Abraham et al. ............. | 713/159 |
| 5,148,481 A | * | 9/1992 | Abraham et al. ............. | 380/46 |
| 5,301,231 A | * | 4/1994 | Abraham et al. ............. | 713/191 |
| 5,926,546 A | * | 7/1999 | Maeda et al. ................. | 705/65 |
| 5,960,084 A | * | 9/1999 | Angelo ........................ | 713/185 |
| 6,035,380 A | * | 3/2000 | Shelton et al. ............... | 711/163 |
| 6,145,035 A | * | 11/2000 | Mai et al. ..................... | 710/62 |
| 6,169,802 B1 | * | 1/2001 | Lerner et al. .................. | 380/44 |
| 6,198,382 B1 | * | 3/2001 | Berger et al. ............. | 340/10.34 |
| 6,243,596 B1 | | 6/2001 | Kikinis | |
| 6,535,922 B1 | * | 3/2003 | Kikinis ....................... | 709/236 |
| 6,553,410 B2 | * | 4/2003 | Kikinis ....................... | 709/218 |

(Continued)

FOREIGN PATENT DOCUMENTS

WO    00/02361    1/2000

(Continued)

OTHER PUBLICATIONS

International Search Report for PCT/SE2003/002018 dated Jul. 29, 2004.

*Primary Examiner*—Matthew D. Anderson
*Assistant Examiner*—Hai V Nguyen
(74) *Attorney, Agent, or Firm*—Nixon & Vanderhye, P.C.

(57) ABSTRACT

The invention refers to an exchangeable power-supplying unit (200, 300) arranged to supply electric power to a device (100, 400). The power-supplying unit (200, 300) is arranged so as to provide the device (100, 400) with one or several additional functionalities and it can preferably be attached so as to form an integral part of the device (100, 400). The additional functionality is accomplished by one or several processing units (220, 312, 319) contained in the power-supplying unit (200, 300) for pre-processing information, which is subsequently communicated from the power-supplying unit (200, 300) to the device (100, 400).

22 Claims, 6 Drawing Sheets

U.S. PATENT DOCUMENTS

| | | | |
|---|---|---|---|
| 6,592,031 B1* | 7/2003 | Klatt | 235/382 |
| 6,662,163 B1* | 12/2003 | Albayrak et al. | 704/275 |
| 6,675,027 B1* | 1/2004 | Huang | 455/575.1 |
| 6,697,944 B1* | 2/2004 | Jones et al. | 713/168 |
| 6,748,535 B1* | 6/2004 | Ryan et al. | 713/189 |
| 6,754,481 B1* | 6/2004 | Nilsson | 455/406 |
| 6,865,690 B2* | 3/2005 | Kocin | 714/14 |
| 6,957,342 B2* | 10/2005 | Vatanen | 713/192 |
| 6,971,021 B1* | 11/2005 | Daspit et al. | 713/192 |
| 7,016,704 B2* | 3/2006 | Pallakoff | 455/566 |
| 7,082,539 B1* | 7/2006 | Kitahara et al. | 713/189 |
| 7,146,179 B2* | 12/2006 | Parulski et al. | 455/456.3 |
| 7,149,554 B2* | 12/2006 | Pinder | 455/572 |
| 7,155,425 B2* | 12/2006 | Nykanen | 707/3 |
| 7,178,028 B2* | 2/2007 | Go et al. | 713/170 |
| 7,203,842 B2* | 4/2007 | Kean | 713/189 |
| 7,213,766 B2* | 5/2007 | Ryan et al. | 235/492 |
| 7,325,746 B2* | 2/2008 | Nishizawa et al. | 235/492 |
| 7,366,913 B1* | 4/2008 | Haley | 713/189 |
| 7,398,544 B2* | 7/2008 | Candelore et al. | 726/2 |
| 2002/0013161 A1 | 1/2002 | Schaeffer et al. | |
| 2002/0034302 A1* | 3/2002 | Moriai et al. | 380/270 |
| 2002/0095594 A1* | 7/2002 | Dellmo et al. | 713/200 |
| 2002/0104004 A1* | 8/2002 | Couillard | 713/178 |
| 2002/0114467 A1* | 8/2002 | Vatanen | 380/270 |
| 2002/0120843 A1* | 8/2002 | Goodman et al. | 713/164 |
| 2002/0175665 A1 | 11/2002 | O'Grady et al. | |
| 2002/0188863 A1* | 12/2002 | Friedman | 713/201 |
| 2003/0026427 A1* | 2/2003 | Couillard | 380/277 |
| 2003/0074572 A1 | 4/2003 | Hayashi | 713/193 |
| 2003/0093698 A1* | 5/2003 | Challener et al. | 713/202 |
| 2003/0128843 A1* | 7/2003 | Brown et al. | 380/46 |
| 2003/0132918 A1* | 7/2003 | Fitch et al. | 345/173 |
| 2004/0066273 A1* | 4/2004 | Cortina et al. | 340/5.1 |
| 2004/0082361 A1* | 4/2004 | Rajagopalan | 455/556.1 |
| 2004/0120195 A1* | 6/2004 | Okuda | 365/200 |
| 2004/0125758 A1* | 7/2004 | Hayduk | 370/310 |
| 2004/0185900 A1* | 9/2004 | McElveen | 455/556.1 |
| 2004/0228175 A1* | 11/2004 | Candelore et al. | 365/158 |
| 2004/0252837 A1* | 12/2004 | Harvey et al. | 380/270 |
| 2005/0036622 A1* | 2/2005 | Hay et al. | 380/270 |
| 2005/0094463 A1* | 5/2005 | Nishizawa et al. | 365/222 |
| 2005/0109841 A1* | 5/2005 | Ryan et al. | 235/380 |
| 2005/0178845 A1* | 8/2005 | Desfontaines et al. | 235/492 |
| 2005/0286718 A1* | 12/2005 | Meintrup et al. | 380/46 |
| 2006/0208066 A1* | 9/2006 | Finn et al. | 235/380 |
| 2006/0219776 A1* | 10/2006 | Finn | 235/380 |
| 2007/0033419 A1* | 2/2007 | Kocher et al. | 713/193 |
| 2007/0067835 A1* | 3/2007 | Koistinen et al. | 726/9 |
| 2007/0074045 A1* | 3/2007 | Van Essen et al. | 713/189 |
| 2007/0098153 A1* | 5/2007 | Nishikawa | 380/30 |
| 2007/0189055 A1* | 8/2007 | Okuda | 365/114 |

FOREIGN PATENT DOCUMENTS

| | | |
|---|---|---|
| WO | 01/35613 | 5/2001 |

* cited by examiner

EXCHANGEABLE MODULE FOR ADDITIONAL FUNCTIONALITY

This application is the US national phase of international application PCT/SE2003/002018 filed 18 Dec. 2003, which designated the U.S., the entire contents of which are hereby incorporated by reference.

FIELD OF INVENTION

The present technology relates to an exchangeable power-supplying module that can be connected to a device. In particular, the technology relates to a power-supplying module for providing an additional external function to a device. More particularly, the technology relates to a power-supplying module for providing an additional external function to a handheld device.

BACKGROUND

In recent years, there has been a rapid and extensive development of intelligent devices. A non exhaustive list of such devices are laptops, personal digital assistants (PDA:s), digital notebooks, play-gadgets, mobile phones, land-radios (e.g. walkie-talkies) etc.

Requirements have been placed on such intelligent devices, especially handheld devices, to have a compact, highly integrated and small sized design. At the same time it is frequently required that these devices support the addition of new functionality. However, it is usually difficult to accomplish addition of new functions, especially if a function requires additional hardware, since the compact design leaves little or no space for addition of new extra hardware. If the extra hardware can be added at all it is usually associated with costly design changes.

In this connection it is well known to attach exterior accessory modules to a device for providing the device with an additional functionality. Such accessory modules are usually attached to the device through a connector, e.g. a connector arranged at the lower end of a mobile phone. Typically, these accessory modules operate essentially independently from the device attached upon. For example, an accessory module may only require electrical power from the device, whereas the function provided by the module is essentially executed within the module it self and then subsequently delivered to the device. Conversely, the device is typically designed to operate independently from any accessory module, i.e. the device can operate with or without any accessory module.

A few examples may be clarifying. A module comprising an MP3-player may be attached to a PDA for supplying recorded music to the PDA, without the need for any processing assistance from the PDA. Likewise, a module comprising a radio may be attached to a mobile phone for supplying radio broadcasts to the mobile phone without the need for any processing assistance from the phone. Similarly, a module comprising a hands-free function may be attached to a mobile phone, where the module may transmit and receive signals to and from a wireless headset without any processing assistance from the phone. Consequently, the new functionality is provided by the attached module and subsequently delivered to the device, whereas the device itself can remain unchanged regardless of any attached module, which is an important advantage in many applications.

However, exterior accessory modules show considerably drawbacks, especially in connection with compact, highly integrated and small sized devices. A compact design makes it difficult to accomplish a firm and strong mechanical connection between the device and an exteriorly attached accessory module. An attached module may therefore fit rather loosely to the device. This increases the risk for an intermittent electrical contact between a module and the device, especially in harsh environments. A weak mechanical connection between device and module may even enable forces in a harsh environment to rip the module off the device, especially when the module is attached to the exterior of the device. The requirements for a compact mechanical construction may also diminish the possibility to accomplish a environment proof connection between an exterior module and the device, which means that dust and humidity may affect the electrical connectors of the device and the module. Another problem with known exterior accessory on modules is that a detached module usually leaves the mechanical and electrical connectors of the device openly exposed to the environment. The connectors may then be scraped, deformed, fractured, corroded, or otherwise damaged so that the device becomes unable to function with a module.

In addition to the exterior accessory modules as mentioned above there are other more or less interior accessory modules for providing a device with a range of new functionalities. One example is the so-called PCMCIA-card (Personal Computer Memory Card International Association) and other similar small circuit boards. Such small circuit boards are normally inserted into the device through a slot arranged on the device, e.g. at the side of a laptop, or even to a PDA or mobile phone. An interior PCMCIA-card or similar does not show the same exposure to the environment as previously described exterior modules. Mechanical forces may in particular have less impact on such cards, since they are mechanically protected by the device to which they are inserted. However, the slot through which such a card is inserted is often left open when the card is taken out. The recess in which the card is received will then be exposed to the environment and particles, fluid (e.g. water), humidity or similar can then easily assemble in the recess to affect electrical and mechanical connectors. Particles may for example block mechanical and electrical connectors and water or humidity may cause corrosion on the electrical connectors, etc.

Moreover, the general idea to attach an exterior or interior module to a device inevitably makes the device bulkier, which is totally opposite to the requirements for a compact, highly integrated and small sized design.

There is consequently a need for an exchangeable module that provides an additional functionality to a device, which module is large enough to comprise additional hardware needed for the additional functionality, and where the module can be connected to the device to form a compact, highly integrated and small sized apparatus possessing a good protection from the environment. It is also preferred that the module supports a proper modular design so that the device can remain essentially unchanged regardless of the module currently used.

BRIEF SUMMARY

In the light of the drawbacks associated with prior art as described above the technology discloses a module that is formed by supplying an existing, integral and exchangeable part of a compact intelligent device with the hardware and possible software needed for providing an additional functionality to the device.

An intelligent device, especially a handheld device, having a compact, highly integrated and small sized design has very few integral and exchangeable parts. If there are exchangeable parts at all then they are usually difficult to access and the parts are usually not large enough to include any additional hardware, e.g. include an antenna, a small circuit board or similar bulky components.

However, intelligent devices are usually provided with a power supplying battery that forms an integral and exchangeable part of the device. These batteries are comparably large and they are usually easy to access without any complex dismounting of other parts of the device. Thus, according to the present technology the hardware and possibly software needed for an external additional functionality (add-on function) are incorporated into the comparably large, integral and exchangeable power supplying battery of the device in question.

The power supplying battery then becomes an exchangeable and integral module of the device, which module provides various add-on functions to the device depending on the configuration of the hardware and possible software that is incorporated into the module.

In addition, the power supplying battery according to an example embodiment is supplied with a data-bus and possibly a control-bus to communicate the pre-processed information provided by the module to the device, which facilitates the communication between the device and the add-on function that is incorporated into the battery.

The use of an integral battery as an exchangeable function-module assists the design of a compact, highly integrated and small sized apparatus. Moreover, it also enables a good protection from the environment, since it is fairly easy to accomplish a good sealing in connection with the comparably large surfaces associated with the battery, and since the power supplying battery is never detached from the device during use, which leaves the mechanical and electrical connectors of the device protected from the environment during use. In addition, a power supplying battery is usually easy to access and it is large enough to contain a small circuit board comprising ordinary integrated circuits and/or discrete components, which e.g. enables the production of customized function-modules in small series without the need for designing mask-works or similar to produce customized silicon circuitry.

It is preferred that the add-on function in the exchangeable integral function-module is provided by the function of the module itself, whereas the device remains essentially unchanged regardless of the module currently used, if any. This supports a truly flexible and modular design of the device.

Further advantages of the present technology will appear from the following detailed description of preferred example embodiments.

BRIEF DESCRIPTION OF THE DRAWINGS

Preferred embodiments of the present technology will now be described with reference to the accompanying drawings, in which.

DETAILED DESCRIPTION OF EXAMPLE EMBODIMENTS

The present technology can be implemented in a number of intelligent devices having a compact, highly integrated and small sized design that is required to support an addition of various new external functionalities. A non-exhaustive list of such intelligent devices are laptops, personal digital assistants (PDA:s), digital notebooks, play-gadgets, mobile phones, land-radios (e.g. walkie-talkies) etc.

A function-module according to the present technology may comprise a vast number of different functions, for example a data modem (e.g. WLAN-modem), a positioning function (e.g. GPS or a gyro, or even a 3D-gyro), a biometric surveillance function (e.g. pulse beat surveillance), a digital camera, a memory, a mass-storage, a memory/IO-card (e.g. MemoryStick, MMC, Compact Flash, etc), an MP3-player, a radio receiver or other sounding or picturing functions. It should be noted that the technology may comprise one or several functions.

An Add-On Function-Module in a Wireless Mobile Phone or Similar

An example embodiment will now be described in connection with FIG. 1A, using a hand-held wireless mobile phone 100 as an example. The wireless mobile phone 100 could be a short-range DECT-phone or a long-range GSM-, CDMA-, or WCDMA-phone, or any other suitable wireless mobile phone.

Figure 1A:
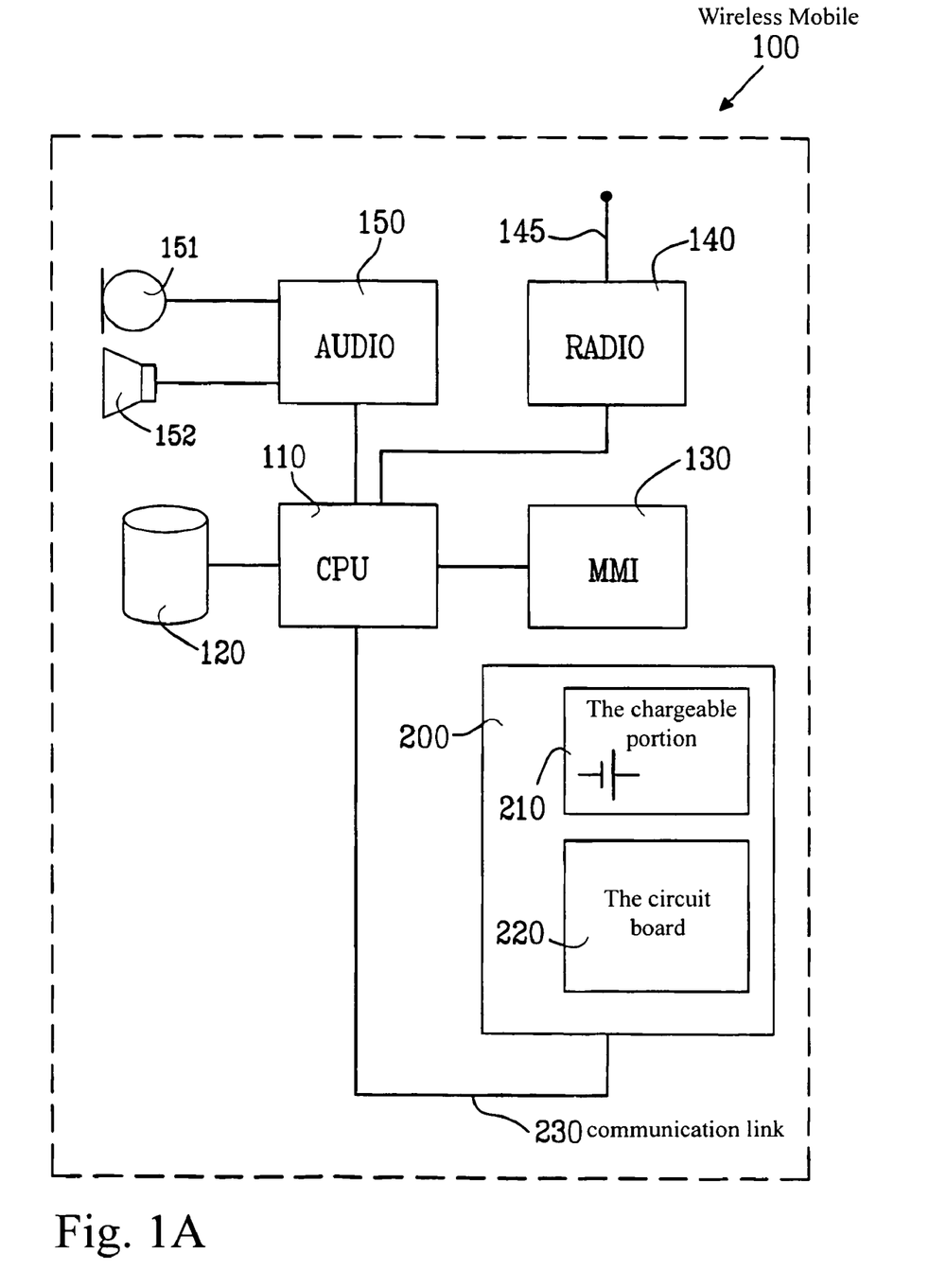
FIG. 1A shows a schematic view of a wireless mobile phone provided with an additional functionality embedded in the exchangeable power supplying battery of the mobile phone.

As is schematically illustrated in FIG. 1A the exemplary phone 100 has a processing unit 110. As the processing unit 110 is schematically illustrated in FIG. 1A it should be understood that the phone 100 could have more than one processing unit. The phone 100 may e.g. have a general processing unit for controlling the overall application program and one or more dedicated processing units for controlling such signal processing as e.g. speech coding, signal filtering, data-packet handling etc. Said processing units can be of any ordinary processing type that is commonly used in connection with wireless mobile phones.

The processing unit 110 in FIG. 1A is schematically connected to a memory 120. The memory 120 may comprise a volatile memory, e.g. a random access memory (RAM), and/or a more permanent memory, e.g. a FLASH memory, or some other suitable volatile or permanent memory. The memory 120 may integrated or removable and it may be used as a working memory for temporary storing data, e.g. temporary storing intermediate data on behalf of the application program. The memory 120 may also be used for a more permanent storing of data, e.g. storing the application software and/or storing other data that are essential for the user of the phone, e.g. storing calendar data or phonebook data. If the memory is large enough it may even be used as a mass storage, e.g. for storing digital images photographed by a possibly digital camera attached to the phone 100, or voice messages dictated to a dictaphone function arranged in the phone 100.

The processing unit 110 in FIG. 1A is also schematically connected to a man-machine-interface 130 (MMI). In a basic embodiment the MMI-unit 130 may include a keyboard and a display. The interface 130 may be very simple in some embodiments, whereas other embodiments may have a more sophisticated interface 130, e.g. an MMI-unit that uses voice control, a touch-screen and/or other audible, visual, haptical or graphical control means. The MMI-unit 130 enables a user to communicate with the phone 100, e.g. command the phone 100 to perform a certain action, program a certain setting into the phone 100, store and fetch information in the phone 100 etc.

In addition, the processing unit 110 in FIG. 1A is schematically connected to a radio unit 140 that has an antenna 145 for receiving and transmitting modulated microwave signals or other high-frequency signals. The radio unit 140 constitutes the main wireless communication link of the wireless mobile phone 100, through which the phone 100 transmits and receives messages. The radio unit 140 comprises the usual components needed for transmitting and receiving messages to and from a wireless mobile phone 100, e.g. frequency mixers, frequency converters, analogue and/or digital filters, amplifiers and possibly A/D- and D/A-converters, etc.

The processing unit 110 in FIG. 1A is also schematically connected to an audio unit 150, having a loudspeaker 151 and a microphone 152. The audio unit 150 is needed if the phone 100 receives and transmits voice messages. A voice message is typically received by the phone 100 via the radio unit 140, in which the message is preferably converted to digital data signals, possible in the form of data-packets, that are subsequently transported to the processing unit 110. The processing unit 110 may in turn perform additional signal processing. The resulting digital data, possible in the form of data-packets, are subsequently transported to the audio unit 150. The audio unit 150 receives the digital data and converts it into a voice signal that is supplied to the loudspeaker 151, which converts the voice signal to an audible signal that can be heard by a user of the phone 100. A transmission of a voice message from the phone 100 can be done by detecting the voice of a user through the microphone 152 of the audio unit 150, which unit preferably converts the voice message to digital data, possible in the form of data-packets. The digital data is subsequently transported to the processing unit 110, which may in turn perform additional signal processing. The resulting digital data, possible in the form of data-packets, is transported to the radio unit 140, in which the digital data is converted to a microwave signal that is subsequently transmitted via the antenna 145. It should be noted that transmission and receiving of voice messages could be performed simultaneously, i.e. in full duplex.

As can be noted by the description above the communication between the central processing unit 110 and the other units, i.e. the memory unit 120, the MMI-unit 130, the radio unit 140 and the audio unit 150, may be accomplished by using data-packets, wherein a message may contain one or several data-packets. A single data-packet is preferably composed by several binary bits, e.g. 8, 16, 32 or 64 bits, where some bits may represent control bits such as parity bits or check-sum bits, whereas the majority of the bits in a data-packet represent the message or a part of the whole message. The data communication between the central processing unit 110 and the other units 120, 130, 140 and 150 may be performed without using data-packets and may be performed through a serial or a parallel interface.

The general constitution of an exemplary wireless mobile phone 100 has been schematically described above and the attention is now turned to the inventive battery 200 of the phone 100.

Figure 2:
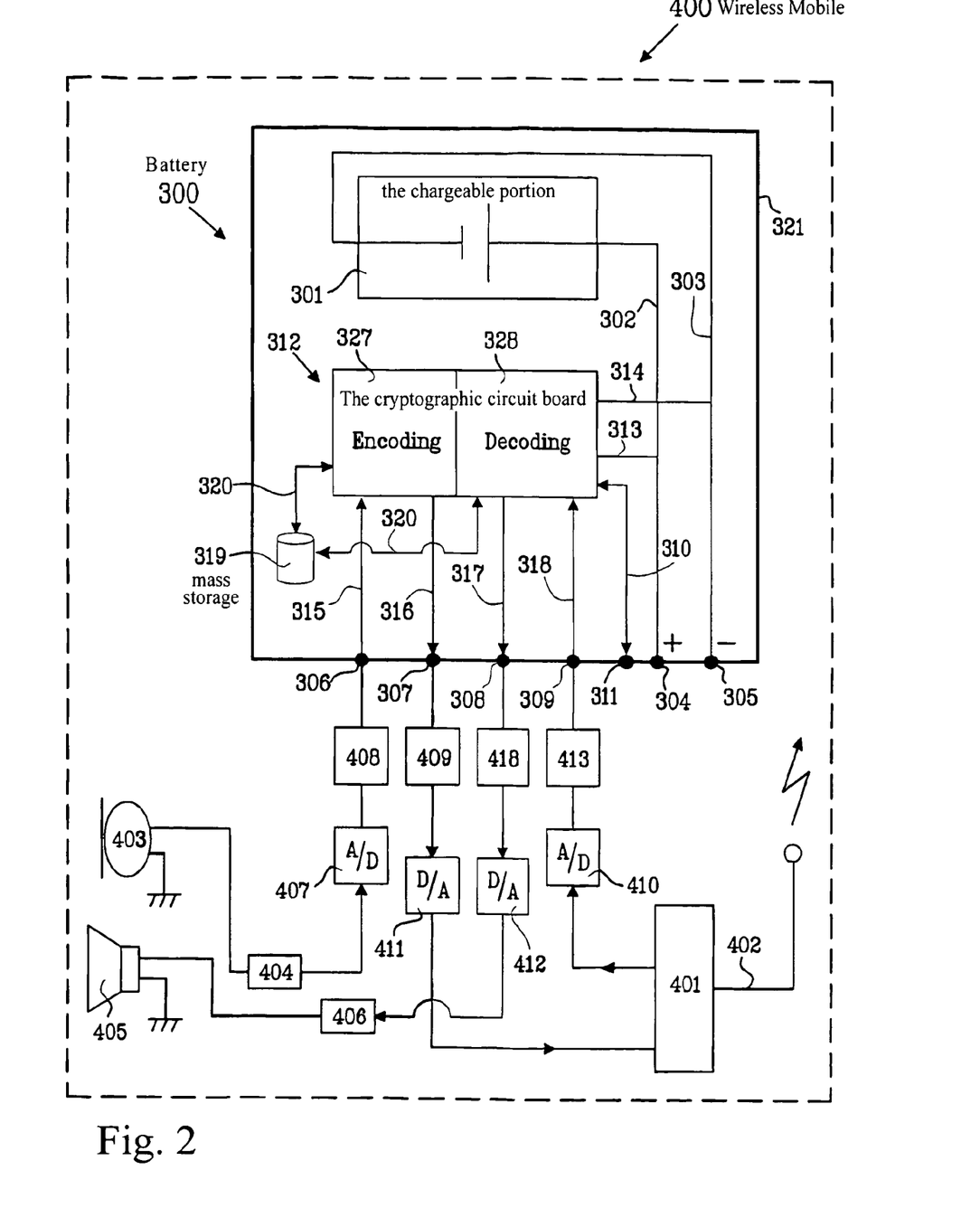
FIG. 2 shows a schematic view of a hand-held radio device that is provided with an add-on function embedded in the exchangeable power supplying battery of the land-radio device.

FIG. 1A schematically illustrates that the phone 100 has an integral and exchangeable battery 200 for supplying the phone 100 with electric power. The power supplying battery 200 comprises a chargeable portion 210 in which electric charges are accumulated. The chargeable portion 210 of the battery 200 is similar or identical to the chargeable portion of ordinary batteries that are commonly used to provide electric power to mobile phones or similar. For the sake of clarity and due the schematic character of FIG. 1A, the physical circuitry for supplying the phone 100 with electric power from the battery 200 and the physical circuitry for communicating data signals between the battery 200 and the other units in the phone 100 has been omitted in FIG. 1A. However, FIG. 2 shows schematically a battery 300 according to a second embodiment of the present technology and the physical circuitry described below in connection with FIG. 2 applies mutatis mutandis to the battery 200.

According to a first example embodiment the battery 200 has been provided with a circuit board 220, which forms a processing unit by comprising the necessary processing hardware and possible software needed to supply the wireless mobile phone 100 with an external add-on function. The processing unit 220 may be supplied with power from the chargeable portion 210, though other power supplying means are conceivable, and it is preferred that the processing hardware is provided with at least one processing unit, e.g. a silicon chip comprising a microprocessor. The chargeable portion 210 of the battery 200 may be somewhat smaller compared to the chargeable portion in ordinary batteries, since the battery 200 has to reserve some space for the circuit board 220.

It should be understood that the battery 200 may have several chargeable portions 210 and/or several circuit boards 220. The battery may additionally or alternatively have several integrated circuits, and/or discrete components that are individually contained in the battery 200 without being glued, soldered or otherwise physically attached to any circuit board. Moreover, the processing hardware of a single battery 200 is not limited to provide the phone 100 with a single external add-on function, on the contrary a single battery 200 may provide the phone 100 with one or several external add-on functions.

Moreover, as can be seen in FIG. 1A the power supplying battery 200 is connected to the processing unit 110 via a communication link 230. The communication link 230 is preferably a suitable general high-speed data-bus that manages data speeds in the Mega-bit range ($10^6$ bits/s). Higher data speeds are even more preferred. However, the speed of the data-bus 230 may be limited in some embodiments, e.g. where the device to which the battery is attached has a rather low processing capability. Nevertheless, the data speed should preferably be high enough to manage a communication of ordinary human voice messages without distorting the audible quality of the transferred message.

Some example embodiments may have a serial data-bus, e.g. the industry-standard USB (Universal Serial Bus), according to the USB 2.0, established in Apr. 27, 2000. Other embodiments of the present invention may have a parallel data-bus, e.g. the data-bus used in connection with the industry-standard PCMCIA (Personal Computer Memory Card International Association), according to the PCMCIA 2.1, established in 1993. Moreover, the data-bus 230 is not limit to an electrical transmission of data. On the contrary, an optic transmission or a radio transmission may also be used in some embodiments.

Figure 1B:
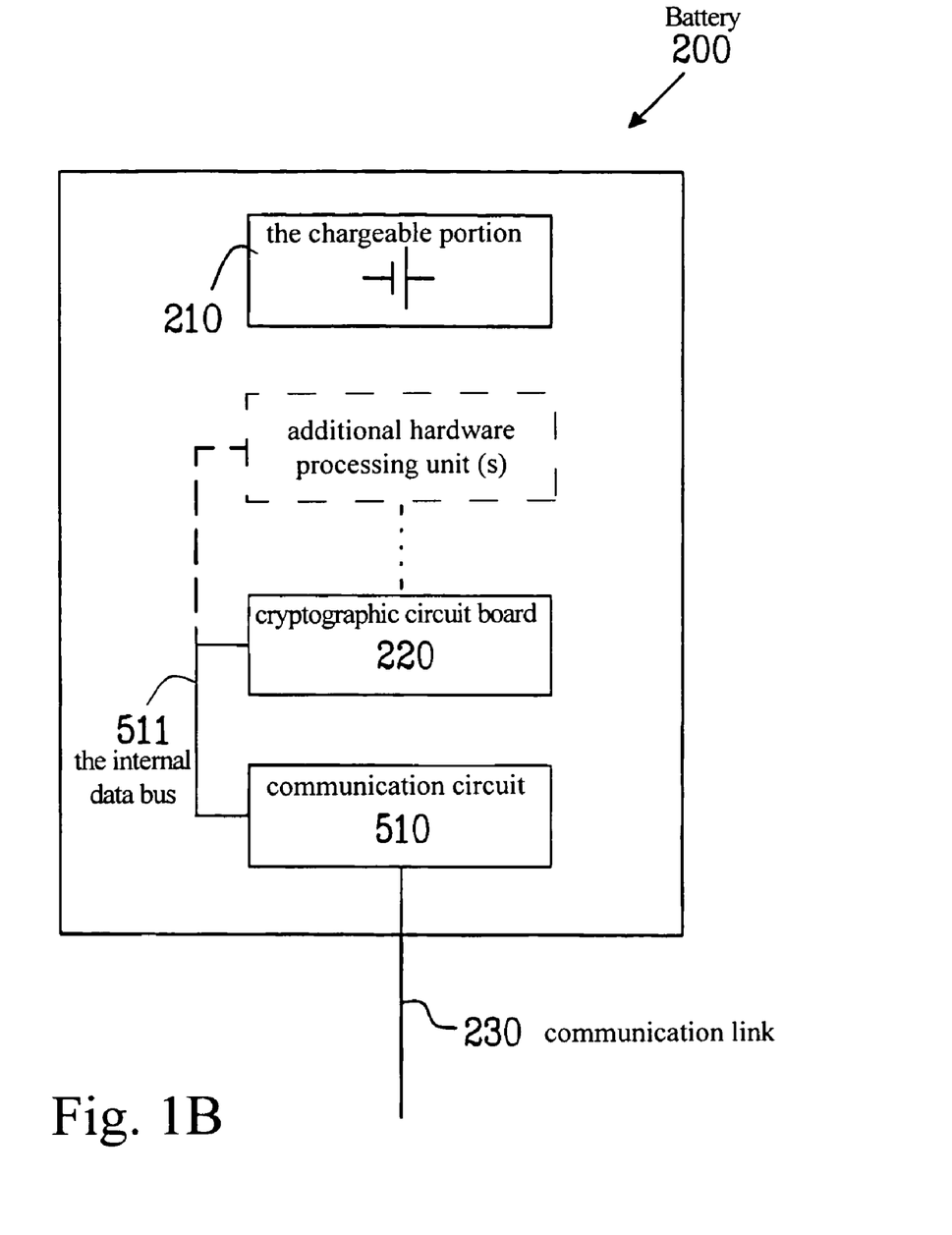
FIG. 1B shows a schematic view of an exchangeable power supplying battery provided with the hardware and possible software needed to provide an add-on function to a device.

Furthermore, as can be seen in the schematic FIG. 1B the battery 200 is preferably provided with a communication circuit 510 for managing the data communication between the battery 200 and the processing unit 110. The communication circuit 510 may be supplied with power from the chargeable portion 210 of the battery 200, though other power supplying means are conceivable. In addition, the communication circuit 510 is preferably connected to the circuit board 220 in the battery through an internal data-bus 511. The internal data-bus 511 may be connected to any hardware within the battery 200 and especially to such processing hardware units that is needed to provide the phone 100 with an additional functionality. This has been schematically illustrated in FIG. 1B by a dashed line and a dashed square. The dashed line extending from the internal data-bus 511 illustrates an extension of the internal data-bus 511 to one or more additional processing hardware units illustrated by the dashed square. In this way any hardware that is arranged within the battery 200 may communicate with the processing unit 110 via the general data-bus 230 and the internal data-bus 511, especially the processing hardware needed to provide the phone 100 with an external add-on function.

As the general constitution of an exemplary battery 200 according to the present technology has been schematically described above the attention is now turned to the processing hardware and possible software within the battery 200, i.e. the processing hardware and possible software needed to provide the phone 100 with an external add-on function.

The idea to incorporate the processing hardware and possibly software needed for an external add-on function into the comparably large, integral and exchangeable power supplying battery of the device in question opens up for providing the device with a range of additional functionalities. A few preferred add-on functions will now be described in some detail below.

A first add-on function has been accomplished by arranging a cryptographic function on the circuit board 220 embedded in the battery 200. The fact that the battery 200 can comprise a small circuit board 220 suitable for production in small series is particularly advantageous in connection with a cryptographic function, since it enables the design of circuit boards comprising a customized cryptographic function that is unique to a small group of users. This strengthens the control and secrecy of the cryptographic hardware and its function. Moreover, the battery 200 may be physically marked with numbers, lines or colors to inform a user whether a cryptographic function is currently in use and if so, the type of cryptographic function that is used etc.

A cryptographic add-on function enables a wireless mobile phone 100 to receive and decode various encoded messages, which is typically received via the radio unit 140 of the phone 100. The received message may be a voice message, a data message or some other kind of message. The message may be converted to digital data by the radio unit 140, where the data is subsequently transported via the processing unit 110 to the cryptographic function arranged on the circuit board 220. An encoded message, i.e. data-packets, may also be received by the processing unit 110 from the memory 120, and then subsequently transported to the cryptographic function arranged on the circuit board 220. The cryptographic function decodes the received message and the resulting data is subsequently transported back to the processing unit 110. The processing unit 110 may in turn perform additional processing and then decide if the resulting data or possible data-packages should be stored in the memory unit 120, displayed on the MMI-unit 130 or sounded from the audio unit 150 or possibly transmitted by the radio unit 140.

A message may also be encoded and transmitted by the wireless mobile phone 100. The message may e.g. be a voice message received by the processing unit 110 from the audio unit 150, or a data message received by the processing unit 110 from the data memory 120. The data received by the processing unit 110 are transported to the cryptographic function arranged on the circuit board 220. The cryptographic function encodes the received data and the resulting data are subsequently transported back to the processing unit 110. The processing unit 110 may in turn perform additional processing and then decide if the resulting data should be transmitted by the radio unit 140 or even transported to be stored in the memory unit 120. Hence, the memory 120 may contain encoded as well as decoded data.

A second add-on function has been accomplished by incorporating a mass-storage into the battery 200. In this embodiment the circuit board 220 is provided with a FLASH memory, a small mechanical hard disk or some other suitable small mass-storage device for storing hundreds of Mega-bytes ($10^6$ bytes) and preferably tenths of Giga-bytes ($10^9$ bytes). The communication between the mass-storage unit arranged on the circuit board 220 and the other units in the mobile phone 100 is performed in essentially the same way as previously described in connection with the cryptographic add-on function. The fact that the battery 200 is exchangeable is particularly advantageous in connection with a mass-storage, since this enables a user to move the contents of the mass-storage unit arranged on the circuit board 220 to another device that uses the same kind of battery 200. This obviously facilitates the over all exchange of large quantities of data, at least compared to an exchange of such data through the radio unit 140.

A third add-on function has been accomplished by incorporating a WLAN (Wireless Local Area Network) modem into the battery 200. In this embodiment the circuit board 220 is provided with a WLAN-modem that e.g. supports the IEEE 802.11 WLAN-standard, or some other suitable WLAN functionality. Since the WLAN-modem communicates in a wireless fashion the circuit board 220 has to be provided with an antenna (not shown). The communication between the WLAN-modem arranged on the circuit board 220 and the other units in the mobile phone 100 is performed in essentially the same way as previously described in connection with the cryptographic add-on function, except the fact that messages are being transmitted and received through the WLAN-modem. In this way the wireless mobile phone 100 is provided with an extra communication link in addition to the main wireless communication link provided by the radio unit 140. This is particularly advantageous, since the ordinary radio unit 140 of the phone 100 usually has a low capacity compared to the capacity provided by a WLAN-modem. The fact that the battery 200 is exchangeable opens up for the possibility to add a WLAN-function to a standard wireless phone. This may be particularly advantageous if large quantities of data should be transferred between the phone 200 and some device connected to a WLAN, which may be the case if the memory 120 in the phone 100 is large enough to comprise digital pictures or similar, or if the MMI-unit 130 comprises a video display for video-conferences. The possibility to provide a phone 100 with an add-on WLAN-function also prepares an expansions of such phones to encompass future telecommunication networks that merge different techniques, e.g. merge CDMA, WCDMA or some other 3G-standard with WLAN-standards or other types of wireless local networks.

A fourth add-on function has been accomplished by incorporating a position determination function into the battery 200. In this embodiment the circuit board 220 is provided with a gyro, e.g. the ADXRS150, ±150°/s Single Chip Yaw Rate Gyro with Signal Conditioning from Analog Devices Inc, (www.analog.com). The communication between the gyro function arranged on the circuit board 220 and the rest of the mobile phone 100 is performed in essentially the same way as previously described in connection with the cryptographic add-on function. A gyro is particularly advantageous as a complement to a GPS-function, which may also be incorporated into the battery 200, preferably together with a gyro-function. As is commonly known GPS-receivers work poorly when the receiver is out of sight from the GPS-satellites, e.g. in an indoor environment. The gyro according to this embodiment can supplement a GPS-function in such situations. People that may need this add-on function in their handheld devices are firefighters, policemen, ambulance personnel and other rescuing personnel.

An Add-On Function-Module in a Land-Radio or Similar

The present technology has been described above in connection with an exemplary wireless mobile phone 100. Such a mobile phone 100 is normally equipped with a comparably high processing capability. However, there are other devices with considerably lower processing capability. One possible category of such devices is portable hand-held land-radios, e.g. land-radios used by police, firefighters or other security, surveillance or rescue personnel. This category may, amongst other devices, include more or less advanced walkie-talkies or similar two-way radios.

FIG. 2 shows schematically a battery 300 according to a second example embodiment. The battery 300 is preferably an integral and exchangeable power supplying battery of a hand-held wireless land-radio 400, though other devices beside land-radios are clearly conceivably. The battery 300 comprises a chargeable portion 301, a cryptographic circuit 312 for coding/decoding voice and data, and possibly a mass-storage 319 for storing data. It should be understood that the battery 300 may comprise several chargeable portions and/or several circuits that provide a land-radio 400 or similar with several add-on functions.

The chargeable portion 301 of the battery 300 is similar or identical to the chargeable portion of ordinary batteries that are commonly used to provide electric power to land-radios or similar. However, the chargeable portion 301 of the battery 300 may be somewhat smaller compared to the chargeable portion in ordinary batteries, as the battery 300 has to reserve some room for the cryptographic circuit 312 and possible other additional circuitry.

As can be seen in FIG. 2 the chargeable portion 301 comprises a first and a second electric power circuit-line 302, 303 for supplying the land-radio with electric power via the power output connectors 304, 305 of the battery 300. The output connectors 304, 305 are preferably ordinary battery connectors commonly used for providing electrical power from a battery to a land-radio or similar. However, other more endurable connectors are conceivable.

In addition, the cryptographic circuit 312 and possibly other circuitry may also have the electric power supplied by the chargeable portion 301 of the battery 100. This is schematically illustrated by a first and a second electric power circuit-line 313, 314. However, as an alternative the cryptographic circuit 312 and other conceivable circuitry may have their electric power supplied by another separate chargeable portion (not shown) of the battery 100 or even by the land-radio 400.

The encoding part 327 of the cryptographic circuit 312 is schematically illustrated in FIG. 2. An encoding input-line 315 is connected to an input of the encoding part 327, and to an encoding input-connector 306 of the battery 300. An encoding output-line 316 is connected to an output of the encoding part 327, and to an encoding output-connector 307 of the battery 300. The decoding part 328 of the cryptographic circuit 312 is also schematically illustrated in FIG. 2. A decoding input-line 318 is connected to an input of the decoding part 328, and to a decoding input-connector 309 of the battery 300. A decoding output-line 317 is connected to an output of the decoding part 328, and to a decoding output-connector 308 of the battery 300.

The signal connectors 306-309 may preferably be ordinary battery connectors commonly used for providing electrical power from a battery to a land-radio or similar. However, other more endurable connectors and/or connectors especially designed for transferring signals are also conceivable.

It can be understood from FIG. 2, that a signal supplied to the encoding input-connector 306 and consequently to the encoding input-line 315 of the cryptographic circuit 312 will be encoded by the encoding part 327 in the cryptographic circuit 312. The encoded signal is supplied to the encoding output-line 316 and consequently to the encoding output-connector 307. It can also be understood from FIG. 2, that an encoded signal that is supplied to the decoding input-connector 309 and consequently to the decoding input-line 318 of the cryptographic circuit 312 will be decoded by the decoding part 328 of the cryptographic circuit 312. The decoded signal is then supplied to the decoding output-line 317 and consequently to the decoding output-connector 308.

The encoding is preferably executed on a digital signal as opposed to an analogue signal. This is illustrated in FIG. 2 wherein an analogue voice signal from a microphone 403 is converted to a digital signal by an A/D-converter 407 and then supplied to the encoding part 327 of the cryptographic circuit 312. Possible additional analogue components 404 (e.g. analogue amplifiers, etc) could affect the voice signal before the A/D-conversion, and possible additional digital components 408 (e.g. digital filters, etc) and/or digital signal processing could affect the signal after A/D-conversion, i.e. before an encoding. When the digital voice signal has been encoded in the encoding part 327 of the cryptographic circuit 312 it is eventually converted to an analogue signal in a D/A-converter 411. Possible additional digital components 409 (e.g. digital filters, etc) and/or digital signal processing could affect the signal between encoding and D/A-conversion. The analogue voice signal eventually obtained from the D/A-conversion is typically supplied to a radio unit 401 of the land-radio 400, wherein the signal is transformed and transmitted via the antenna 402 of the radio unit 401 in a well-known manner.

Like the encoding above, the decoding is also preferably executed on a digital signal. This is illustrated in FIG. 2 wherein a modulated microwave signal or some other high-frequency signal is received and transformed in a well-known manner by the radio unit 401 of the land-radio 400. The transformed signal is then supplied to an A/D-converter 410 for conversion to a digital signal, before the signal is supplied to the decoding part 328 of the cryptographic circuit 312. Possible additional digital components 413 (e.g. digital filters, etc) and/or digital signal processing steps could affect the signal after A/D-conversion, i.e. before a decoding. When the digital signal has been decoded in the decoding part 328 of the cryptographic circuit 312 it is eventually converted to an analogue signal in the D/A-converter 412. Possible additional digital components 418 (e.g. digital filters, etc) and/or digital signal processing steps could affect the signal between decoding and D/A-conversion. The analogue voice signal eventually obtained from the D/A-conversion can e.g. be supplied to a loudspeaker/earphone 405 of the land-radio 400. Note that additional analogue components 406 (e.g. analogue amplifiers, etc) could affect the voice signal before it is supplied to the sounding component 405.

As a general comment it should be stressed that the A/D-converters and the D/A-converters mentioned above may actually have to be arranged on the battery 300, if the land-radio 400 in question is totally analogue, i.e. uses an analogue signal processing as opposed to a digital signal processing.

However, the selection of a suitable section in the signal processing chain of the land-radio 400 makes it possible to access the receive/transmit channel of the land-radio 400. A module according to the present embodiment can then utilize the receive/transmit channel of a land-radio 400, possibly in collaboration with other functions of the land-radio 400. In fact, a multitude of different modules can be designed to supply the land-radio 400 with a vast range of different add-on functions that utilize the receive/transmit channel of the land-radio 400. The land-radio 400 can remain the same, i.e. unchanged, whereas the modules may have different designs depending on the add-on functionality provided from the module to the land-radio 400.

Even if encoding/decoding so far has been described in connection with a voice example, it should be emphasized that the present invention is not limited to voice signals. On the contrary, the land radio 400 now may also encode/decode other signals, especially data signals. Such data signals may e.g. represent a text document, a photo, or some other item that should be transmitted and/or received by the land-radio 400. If digital data is to be transmitted from the land-radio 400 it is preferably supplied from a digital mass-storage 319 arranged in the battery 300, though other data sources are conceivable. Said mass-storage 319 is connected to the encoding part 327 of the cryptographic circuit 312 through an internal data-bus 320. Data supplied from the mass-storage 319 to the encoding part 327 of the cryptographic circuit 312 can be encoded and subsequently transmitted by the radio unit 401 in a similar fashion as previously described in connection with the encoding of voice signals. If a data signal is to be received it is preferred that the signal is received by the radio unit 401 and processed in a similar fashion as previously described in connection with the decoding of voice signals, i.e. the data signal is preferably received and transformed by the radio unit 401 and then supplied to the A/D-converter 410 for conversion to a digital signal. The digital data can then be decoded by the decoding part 328 of the cryptographic circuit 312. Received data is preferably stored in the above-mentioned mass-storage 319, though other data storages are conceivable. The mass-storage 319 is connected to the decoding part 328 of the cryptographic circuit 312 through the internal data-bus 320.

In connection with transmitting and/or receiving of data signals it should be emphasized that the battery 300 is preferably provided with an external data-bus, which is illustrated in FIG. 2 by the encoding input/output lines 315, 316 and the decoding input/output lines 318, 317 and their associated input/output connectors 306-309. The data-bus 230 is preferably a general high-speed data-bus for managing data speeds in the Mega-bit range ($10^6$ bits/s). Higher data speeds are even more preferred. Nevertheless, the data speed must be high enough to transfer human voice messages without distorting the audible quality of a transferred message.

If data is stored in a mass-storage 319 arranged in the battery 300 as described above it is possible to detach the battery 300 from the land-radio 400 and move the data to another land-radio. It is also possible to move the data to another device that uses the same kind of battery and the same kind of interface as the land-radio 400, which facilitates a true modularity. In addition, some example embodiments may well have the data stored as encoded data, whereas a decoding may be executed when the data is used by the land-radio 400. Data to be transmitted as well as data that are received can be stored in an encoded format.

The control for managing the encoding/decoding of voice and data and for managing the storing of data is preferably arranged in the cryptographic circuit 312. The cryptographic circuit 312 may in certain embodiments communicate with the mobile phone 400 to exchange external control signals, which is illustrated by the control-line 310 connected to the control-connector 311 of the battery 300, as shown in FIG. 2.

The cryptographic circuit 312 may e.g. be a customer-designed ASIC, FPGA or any other suitable and highly integrated semiconductor circuit comprising a customer-designed encryption/decryption algorithm. The cryptographic circuit 312 may also be a commercially available circuit comprising a suitable encryption/decryption algorithm or any other suitable circuit comprising a suitable encryption/decryption algorithm.

The Battery and the Mechanical Connection

Figure 3A:
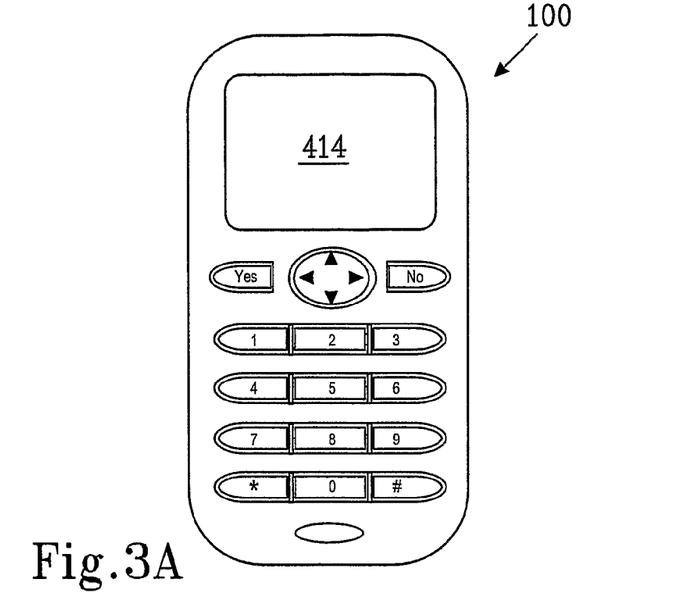
FIG. 3A shows a graphic front view of a mobile phone provided with an exchangeable power supplying battery according to the present technology.
Figure 3B:
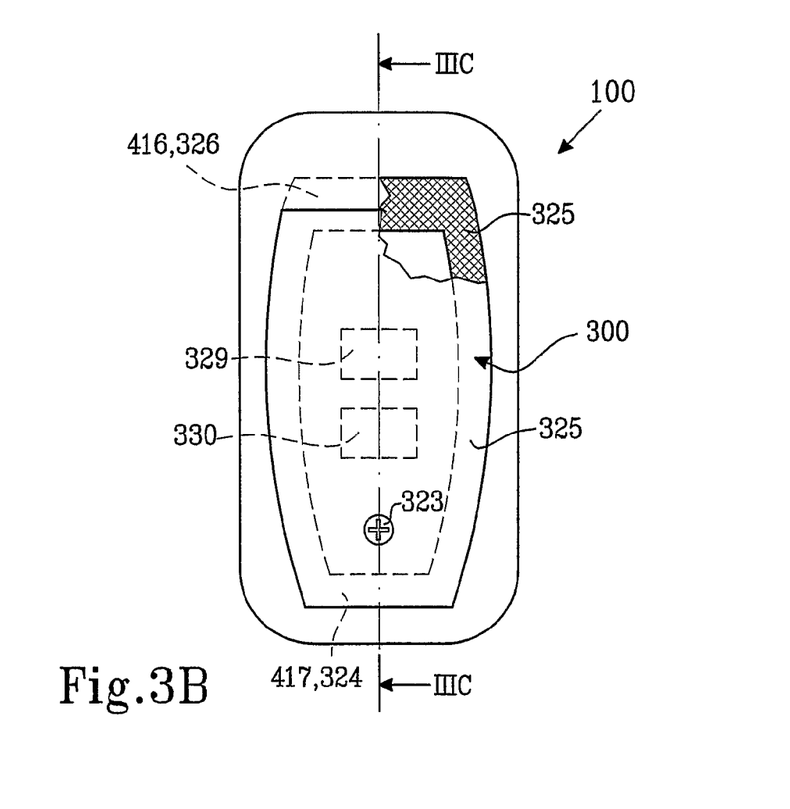
FIG. 3B shows a graphic rear view of the mobile phone in FIG. 3A, provided with a first exemplary exchangeable power supplying battery according to an example embodiment.
Figure 3C:
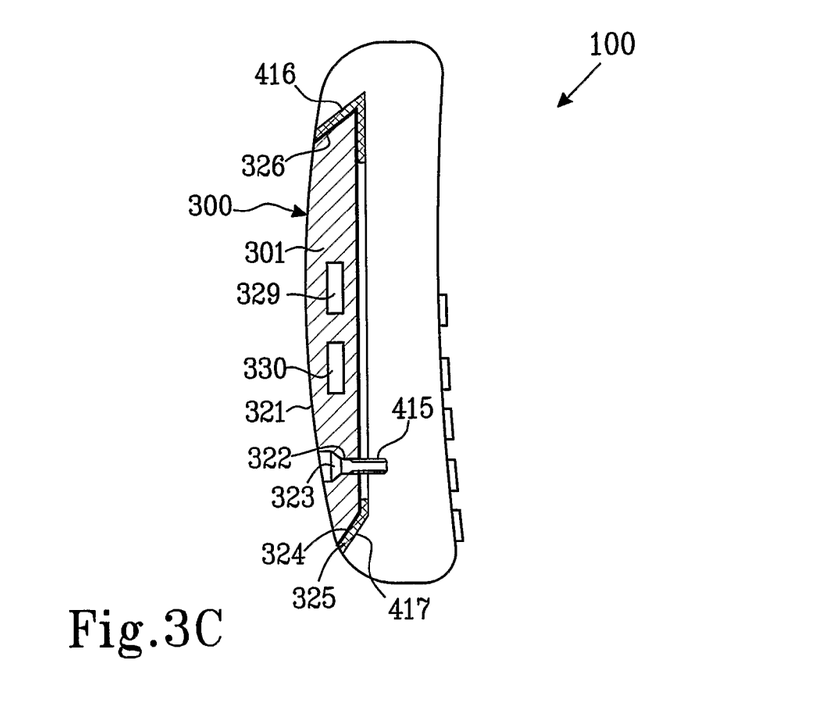
FIG. 3C shows a graphic side view of the mobile phone in FIG. 3A, partly cut along the line IIIC in FIG. 3B.

FIGS. 3A-3C illustrates a mobile phone 100 with a first exemplifying power supplying battery 300 according to an embodiment of the present invention. Nevertheless, it should be understood that a vast variety of other embodiments are possible. The exemplifying mobile phone 100 in FIG. 3A has a somewhat rectangular or oval shape, whereas other shapes are clearly possible. The front portion of the phone 100 has a display 414 and at least some push buttons, e.g. denoted "yes", "no", 0-9, # and *, which are common buttons in connection with mobile phones.

The battery 300 is attached at the rear side of the phone and therefore not visible in the front view of FIG. 3A. The rear side of the phone 100 is shown in FIG. 3B, while FIG. 3C shows a side view of the phone 100 and the battery 300, cut along the line 111C in FIG. 3B. Both FIG. 3B and FIG. 3C show the battery 300 attached to the phone 100 and illustrates that the battery 300 may also have a somewhat rectangular or oval shape that smoothly coincides with the shape of the phone 100 to form a compact, highly integrated and small sized apparatus.

The side view in FIG. 3C shows that the rear side of the phone 100 has a recess for receiving the battery 300. The recess has a wedge-shaped groove 416 arranged at an upper end of the phone 100 to secure the battery 300. A slanted surface 417 is arranged at a lower end of the recess to receive the lower end of the battery 300, so as to exert a force that pushes the battery 300 towards the upper groove 416 when the battery 300 is pressed towards the bottom of the recess. In addition, a threaded bore 415 is arranged at the bottom of the recess near a lower part of the phone 100 to receive a battery screw 323.

As can be seen in FIG. 3C the battery 300 has a rigid casing 321, which comprises a chargeabled portion 301, as illustrated by the sloped lines in FIG. 3C. The casing 321 also comprises two integrated circuits 329, 330. These circuits may be a cryptographic circuit and a digital mass-storage circuit, or some other hardware that is needed to supply the phone 100 with an add-on function. A chamfered upper end 326 of the battery 300 is preferably wedge-shaped to fit the corresponding groove 416 arranged in an upper part of the rear battery recess of the mobile phone 100. A slanted surface 324 is arranged at a lower end of the battery 300 to fit the corresponding slanted surface 417 arranged in a lower end of the rear battery recess of the mobile phone 100. In addition, a bore 322 is arranged at a lower part of the battery 300 for receiving a battery screw 323. The battery screw 323 can be screwed into the threaded bore 415 arranged in the mobile phone 100 for fastening, fixating and tightening the battery 300 to the phone 100. Some embodiments may naturally have several screws 323 and several corresponding bores 305. The battery 300 may also have a tightening rubber seal 325 or similar arranged along the sides of the battery 300 to tighten the contact surfaces between the battery 300 and the phone 100 from water and moist. The area adjacent to the screw 323 may also be provided with a tightening rubber seal.

FIG. 3B shows the rear side of the phone 100 with the power supplying battery 300 attached. The integrated circuits 329 and 330, the rubber seal 325, the slanted surfaces 324, 417 and the chamfered and/or wedge-shaped surfaces 326, 416 are all indicated with dashed lines. The battery screw 323 is also shown in FIG. 3B. The battery 300 has been partly exposed at an upper right corner so that the rubber seal 325 can be seen, which has been illustrated by crossed lines.

Figure 3D:
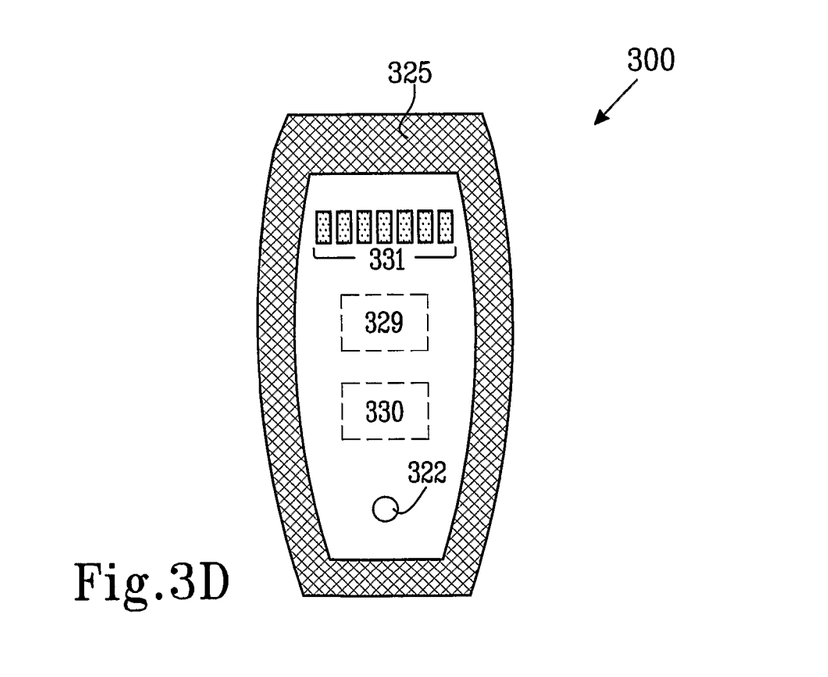
FIG. 3D shows a rear view of a first exemplary exchangeable power supplying battery according to an example embodiment.

FIG. 3D shows the rear side of a detached power supplying battery 300, i.e. the side normally facing the phone 100 during attachment. The integrated circuits 329 and 330 are indicated with dashed lines. Also shown in FIG. 3D are the electrical battery connectors 331 for connecting the battery 300 to the phone 100, the bore 322 for the battery screw 323, and the rubber seal 325.

In the previous text the mechanical connection between the battery 300 and the mobile phone 100 has been described as a screw-fitted connection. However, the invention is not limited to screw-fitted connections. On the contrary, there are other firm and strong mechanical connections, e.g. snap-on connections etc.

Figure 3E:
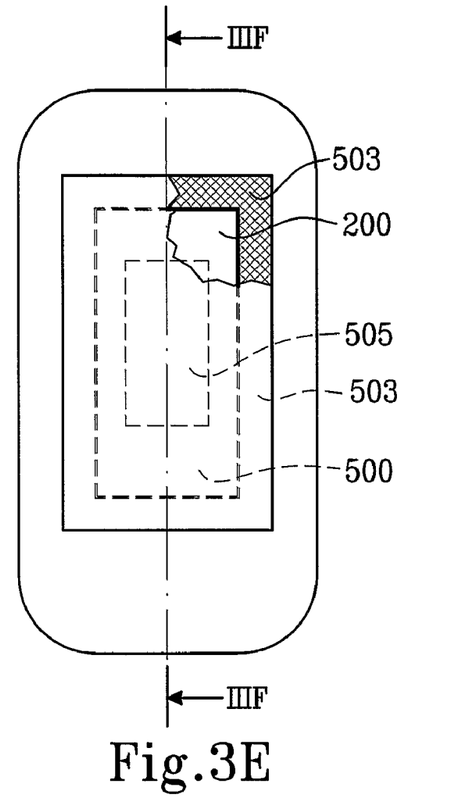
FIG. 3E shows a graphic rear view of the mobile phone in FIG. 3A, provided with a second exemplary exchangeable power supplying battery according to an example embodiment.
Figure 3F:
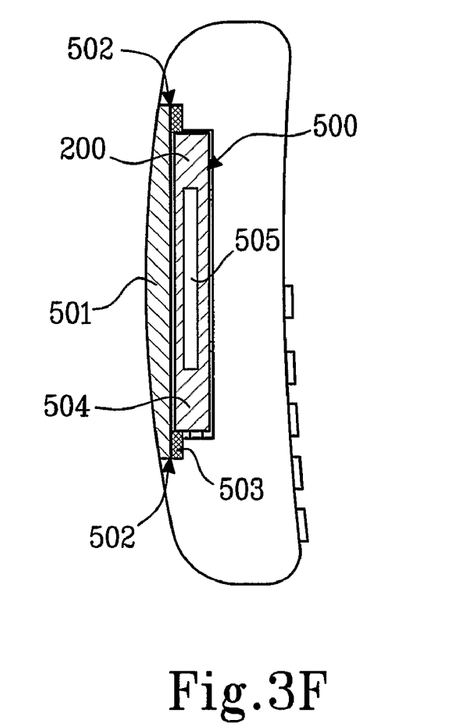
FIG. 3F shows a graphic side view of the mobile phone in FIG. 3E, partly cut along the line IIIF in FIG. 3E.

Turning now to FIGS. 3E-3F, which illustrates the mobile phone 100 with a second exemplifying power supplying battery 200 according to an example embodiment. FIG. 3E shows the rear side of the phone 100, while FIG. 3F shows a side view of the phone 100 and the second exemplifying battery 200, cut along the line IIIF in FIG. 3E. Both FIG. 3E and FIG. 3F show the battery 200 attached to the phone 100 and illustrates that the second exemplifying battery 200 has a rectangular shape, though other shapes are clearly conceivable.

The side view in FIG. 3F shows that the rear side of the mobile phone 100 has a recess 500 for receiving the battery 200. The battery 200 may have essentially any shape as long as it can be tightly fixated in the corresponding recess 500 of the phone 100. The recess 500 and a possible battery 200 placed in the recess 500 are covered by a lid/cover 501. The cover 501 can have a rectangular plate-shaped form or some other suitable shape that fits smoothly to the shape of the phone 100 and that enables the battery recess 500 to be sealed in an environment proof manner. A terrace-shaped groove 502 for receiving the cover 501 is formed around the recess 500 and it extends from the rear surface of the phone 100 into the recess 500. The cover 501 can be attached to the phone 100 by a screw-fitted connection (not shown) or a snap-on connection (not shown), or some other firm and strong mechanical connection that fastens, fixates and tightens the cover 501 to the phone 100.

The battery 200 may also have a tightening rubber seal 503 or similar, arranged at the bottom of the terrace-shaped groove 502 to tighten the contact surfaces between the cover 501 and the phone 100 from water and moist. The battery 200 has been partly exposed at an upper right corner so that the rubber seal 503 can be seen, where the exposed seal 505 has been illustrated by crossed lines.

The battery 200 also contains a chargeable portion 504 and an embedded circuit board 505 that comprises the extra hardware and possible software needed to provide the mobile phone 100 with an add-on function.

Figure 3G:
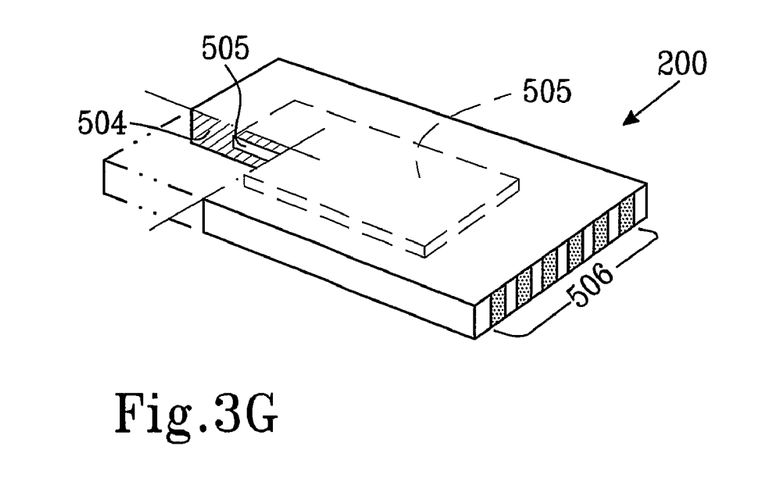
FIG. 3G shows a graphic rear view of a second exemplary exchangeable power supplying battery according to the present invention.

FIG. 3G shows perspective view of the power supplying battery 200. The circuit board 505 is indicated in FIG. 3 with dashed lines. Also shown in FIG. 3G are the electrical battery connectors 506 for connecting the battery 200 to the phone 100.

Even though the inventive function-module has been described in connection with a wireless mobile phone and a hand-held land-radio it should be understood that the invention is not limited to mobile phones or land-radios. On the contrary, the present invention includes all possible variations covered by the scope defined by the appended claims.

REFERENCE SIGNS

| | |
|---|---|
| 100 | Mobile Phone |
| 110 | Central Processing Unit (CPU) |
| 120 | Phone Memory |
| 130 | Man-Machine-Interface (MMI) |
| 140 | Phone Radio Unit |
| 145 | Antenna |
| 150 | Phone Audio Unit |
| 151 | Loudspeaker/Ear Phone |
| 152 | Microphone |
| 200 | First Exemplary Battery |
| 210 | Chargeable Portion |
| 220 | Circuit Board/Processing Unit |
| 230 | General Data-Bus |
| 300 | Battery |
| 301 | Chargeable Portion |
| 302 | First Power Circuit-Line |
| 303 | Second Power Circuit-Line |
| 304 | First Power Output-Connector |
| 305 | Second Power Output-Connector |
| 306 | Encoding Input-Connector |
| 307 | Encoding Output-Connector |
| 308 | Decoding Output-Connector |
| 309 | Decoding Input-Connector |
| 310 | Control-Line |
| 311 | Control-Connector |
| 312 | Cryptographic Circuit |
| 313 | First Power Circuit-Line |
| 314 | Second Power Circuit-Line |
| 315 | Encoding Input-Line |
| 316 | Encoding Output-Line |
| 317 | Decoding Output-Line |
| 318 | Decoding Input-Line |
| 319 | Digital Mass Storage |
| 320 | Internal Data-Bus |
| 321 | Battery Casing |
| 322 | Bore |
| 323 | Battery Screw |
| 324 | Slanted Surface |
| 325 | Rubber Seal |
| 326 | Chamfered Upper End |
| 327 | Encoding Part |
| 328 | Decoding Part |
| 329 | Embedded Integrated Circuit |
| 330 | Embedded Integrated Circuit |

-continued

| | |
|---|---|
| 331 | Battery Connectors |
| 400 | Land-Radio |
| 401 | Radio Unit |
| 402 | Antenna |
| 403 | Microphone |
| 404 | Schematic Analogue Component |
| 405 | Loudspeaker/Ear Phone |
| 406 | Schematic Analogue Component |
| 407 | A/D-Converter |
| 408 | Schematic Digital Component |
| 409 | Schematic Digital Component |
| 410 | A/D-Converter |
| 411 | D/A-Converter |
| 412 | D/A-Converter |
| 413 | Schematic Digital Component |
| 414 | Display |
| 415 | Threaded Bore |
| 416 | Wedge-Shaped Groove |
| 417 | Slanted Surface |
| 418 | Schematic Digital Component |
| 500 | Battery Recess |
| 501 | Cover/Lid |
| 502 | Terrace-Shaped Groove |
| 503 | Rubber Seal |
| 504 | Chargeable Portion |
| 505 | Embedded Circuit Board |
| 510 | Communication Circuit |
| 511 | Internal Data-Bus |

The invention claimed is:

1. An exchangeable power-supplying unit arranged to supply electric power to a device, said exchangeable power-supplying unit comprising:
   at least one processing unit arranged to pre-process information and to communicate said pre-processed information to said device for providing said device with at least one additional function; and
   a cryptographic circuit for coding or decoding said pre-processed information.

2. Said exchangeable power-supplying unit according to claim 1, wherein said exchangeable power-supplying unit is connectable to form an integral part of said device.

3. Said exchangeable power-supplying unit according to claim 1, wherein said exchangeable power-supplying unit comprises a communication link for communicating said pre-processed information to said device.

4. Said exchangeable power-supplying unit according to claim 3, wherein said communication link is a high-speed data-bus.

5. Said exchangeable power-supplying unit according to claim 1, wherein said cryptographic circuit comprises at least one circuit board or at least one integrated circuit, comprising hardware to form said at least one processing unit.

6. Said exchangeable power-supplying unit according to claim 5, wherein said at least one circuit board or said at least one integrated circuit further comprises at least one of a mass-storage, a WLAN-modem, and a positioning device.

7. Said exchangeable power-supplying unit according to claim 1, wherein said exchangeable power-supplying unit is a battery.

8. A device comprising an exchangeable power-supplying unit, said exchangeable power-supplying unit comprising:
   at least one processing unit arranged to pre-process information and to communicate said pre-processed information to said device for providing said device with at least one additional function; and
   a cryptographic circuit for encoding or decoding said pre-processed information.

9. Said device according to claim 8, wherein said device is a wireless handheld device, comprising at least one of a mobile phone, a PDA, a digital notebook, a land-radio, a two-way radio, a walkie-talkie, and an intelligent device.

10. Said wireless handheld device according to claim 9, wherein said exchangeable power-supplying unit has access to a receive/transmit channel of said wireless handheld device.

11. Said device according to claim 8, wherein said exchangeable power-supplying unit is connectable to form an integral part of said device.

12. Said device according to claim 8, wherein said exchangeable power-supplying unit comprises a communication link for communicating said pre-processed information to said device.

13. Said device according to claim 12, wherein said communication link is a high-speed data-bus.

14. Said device according to claim 13, wherein said cryptographic circuit comprises at least one circuit board or at least one integrated circuit, comprising hardware to form at least one processing unit.

15. Said device according to claim 14, wherein said at least one circuit board or said at least one integrated circuit further comprises at least one of a mass-storage, a WLAN-modem, and a positioning device.

16. A telecommunication system comprising a device, said device comprising an exchangeable power-supplying unit, said exchangeable power-supplying unit comprising:
   at least one processing unit arranged to pre-process information and to communicate said pre-processed information to said device for providing said device with at least one additional function; and
   a cryptographic circuit for encoding or decoding said pre-processed information.

17. the system according to claim 16, wherein said device is a wireless handheld device comprising at least one of a mobile phone, a PDA, a digital notebook, a land-radio, a two-way radio, a walkie-talkie, and an intelligent device.

18. A system according to claim 17, wherein said exchangeable power-supplying unit has access to a receive/transmit channel of said wireless handheld device.

19. A method for providing a device with at least one additional functionality, using an exchangeable power-supplying unit arranged to supply electric power to said device and connected to said exchangeable power-supplying unit to form an integral part of said device, the method comprising:
   pre-processing information in at least one or several of processing units;
   encoding or decoding said pre-processed information in said exchangeable power-supplying unit by means of at least one circuit board or at least one or several of integrated circuits comprising hardware to form a cryptographic circuit; and
   communicating said encoded or decoded said pre-processed information to said device.

20. A method according to claim 19, wherein said communicating is performed through a high-speed communication link.

21. A method according to claim 19, wherein said at least additional functionality is one or several of a cryptographic functionality, a mass-storage functionality, a WLAN functionality or a positioning functionality.

22. A method according to claim 19, wherein said device is a wireless handheld device comprising at least one of a mobile phone, a PDA, a digital notebook, a land-radio, a two-way radio, a walkie-talkie, and an intelligent device.

* * * * *

UNITED STATES PATENT AND TRADEMARK OFFICE
CERTIFICATE OF CORRECTION

| | | |
|---|---|---|
| PATENT NO. | : 7,477,923 B2 | Page 1 of 1 |
| APPLICATION NO. | : 10/582490 | |
| DATED | : January 13, 2009 | |
| INVENTOR(S) | : Wallmark et al. | |

It is certified that error appears in the above-identified patent and that said Letters Patent is hereby corrected as shown below:

In Column 12, Line 49, delete "111C" and insert -- IIIC --, therefor.

In Column 16, Line 34, in Claim 17, delete "the" and insert -- The --, therefor.

Signed and Sealed this

Twenty-seventh Day of October, 2009

David J. Kappos
*Director of the United States Patent and Trademark Office*